United States Patent [19]
Mino et al.

[11] Patent Number: 6,154,829
[45] Date of Patent: Nov. 28, 2000

[54] CASCADED ARITHMETIC PIPELINE DATA PROCESSOR

[75] Inventors: Yoshiteru Mino; Tadashi Okamoto; Hiroshi Kadota, all of Osaka, Japan

[73] Assignee: Matsushita Electric Industrial Co., Ltd., Osaka, Japan

[21] Appl. No.: 09/174,562

[22] Filed: Oct. 19, 1998

[30] Foreign Application Priority Data

Oct. 20, 1997 [JP] Japan .................................. 9-286376

[51] Int. Cl.$^7$ ...................................................... G06F 7/38
[52] U.S. Cl. ............................................ 712/35; 348/721
[58] Field of Search ..................................... 708/521, 631, 708/632, 523; 709/400; 712/41, 36, 16, 17, 18, 20, 21, 22, 25, 35, 200, 201; 348/721, 24

[56] References Cited

U.S. PATENT DOCUMENTS

| | | | |
|---|---|---|---|
| 3,875,391 | 4/1975 | Shapiro et al. | 708/521 |
| 5,091,783 | 2/1992 | Miyaguchi | 348/24 |
| 5,572,453 | 11/1996 | Miyake et al. | |
| 5,761,466 | 6/1998 | Chau | 712/200 |
| 5,777,688 | 7/1998 | Miyake et al. | |
| 5,943,491 | 8/1999 | Sutherland et al. | 709/400 |
| 6,052,706 | 4/2000 | Wheeler et al. | 708/631 |

FOREIGN PATENT DOCUMENTS

| | | |
|---|---|---|
| 0 713 291 A2 | 5/1996 | European Pat. Off. . |
| 62-119674 | 5/1987 | Japan . |
| 1-114965 | 5/1989 | Japan . |
| 2-287853 | 11/1990 | Japan . |
| 3-38727 | 2/1991 | Japan . |
| 3-41542 | 2/1991 | Japan . |
| 4-329436 | 11/1992 | Japan . |

*Primary Examiner*—William M. Treat
*Assistant Examiner*—Walter Benson
*Attorney, Agent, or Firm*—Eric J. Robinson; Nixon Peabody LLP

[57] ABSTRACT

Five processing units, namely one data memory, three arithmetic units, and one data memory, are connected together in a cascade arrangement so as to form a single arithmetic pipeline. Likewise, five control devices are connected together in a cascade arrangement and a control signal requesting that a series of data processing operations should start is sent to the first stage control device. Each control device starts to send a micro instruction to a corresponding processing unit upon detection of a processing start request bit in the received control signal and sends a signal which lags the control signal by a delay time equal to a number of cycles required to complete a processing operation of the processing unit, to the next stage control device. The first stage control device is provided with a loop counter operable to count the number of times processing is repeated and automatically generates a processing start request and a processing end request to the next stage control device.

8 Claims, 8 Drawing Sheets

Fig. 2

INST

| ADRS (1~5) | INDEX (#0~#5) | CYCLE | PITCH | REPEAT | MINST |
|---|---|---|---|---|---|
| 31 | 32 | 33 | 34 | 35 | 36 |

Fig. 3

CONT0~CONT5

| START | MODE (A/B) | END |
|---|---|---|
| 41 | 42 | 43 |

CASCADED ARITHMETIC PIPELINE DATA PROCESSOR

BACKGROUND OF THE INVENTION

This invention relates to a data processor having a plurality of processing components connected in cascade.

In multimedia data processors such as a digital signal processor (DSP), various types of arithmetic processing, such as information compression encoding/decoding, filtering, and error correction, are required.

U.S. Pat. No. 5,572,453 shows a data processor suitable for TV video data signal arithmetic processing, wherein in order to switch between one type of processing and another type of processing in each of a plurality of processing units forming a single arithmetic pipeline according to a data signal flow through the processing units, a control signal for controlling such switching is transmitted or generated according to the data signal flow.

The data processor of U.S. Pat. No. 5,572,453 is available to carry out processing operations on video data signals in uninterrupted succession but unable to start a repeat processing operation a given number of times at a given timing. In addition, the conventional data processor has no sequence for automatically stopping such a repeat processing operation.

SUMMARY OF THE INVENTION

Accordingly, an object of the present invention is to provide a data processor in which a series of data processing operations is started at a given timing in a plurality of processing units connected in cascade.

In order for a plurality of processing units forming an arithmetic pipeline to start respective processing operations in sequence according to a data signal flow through the processing units, a control signal requesting that a series of data processing operations should start is transmitted according to the data signal flow. In other words, each of a plurality of processing components connected in cascade is formed of a processing unit for performing a processing operation on data and a control device for controlling the processing operations of the processing unit. A control signal requesting that a series of data processing operations should start is sent to the first stage control device.

Each processing unit receives a data signal, performs a processing operation on the received data signal, and sends a data signal representative of a result of the processing operation to the next stage processing unit. Each control device receives a control signal, starts to send a micro instruction to a corresponding processing unit upon detection of a processing start request bit in the received control signal, and sends to the next stage control device a signal which lags the control signal by a number of cycles required to complete a processing operation of the corresponding processing unit.

The first stage control device has a loop counter for counting the number of times a processing operation is repeated. The first stage control device automatically generates a processing start request bit and a processing end request bit to the next stage control device.

BRIEF DESCRIPTION OF THE DRAWINGS

In the drawings:

FIG. 2 is a diagram showing fields of an instruction read out from the instruction memory of FIG. 1, FIG. 3 is a diagram showing fields of each control signal of FIG. 1.

DETAILED DESCRIPTION OF THE INVENTION

Figure 1:
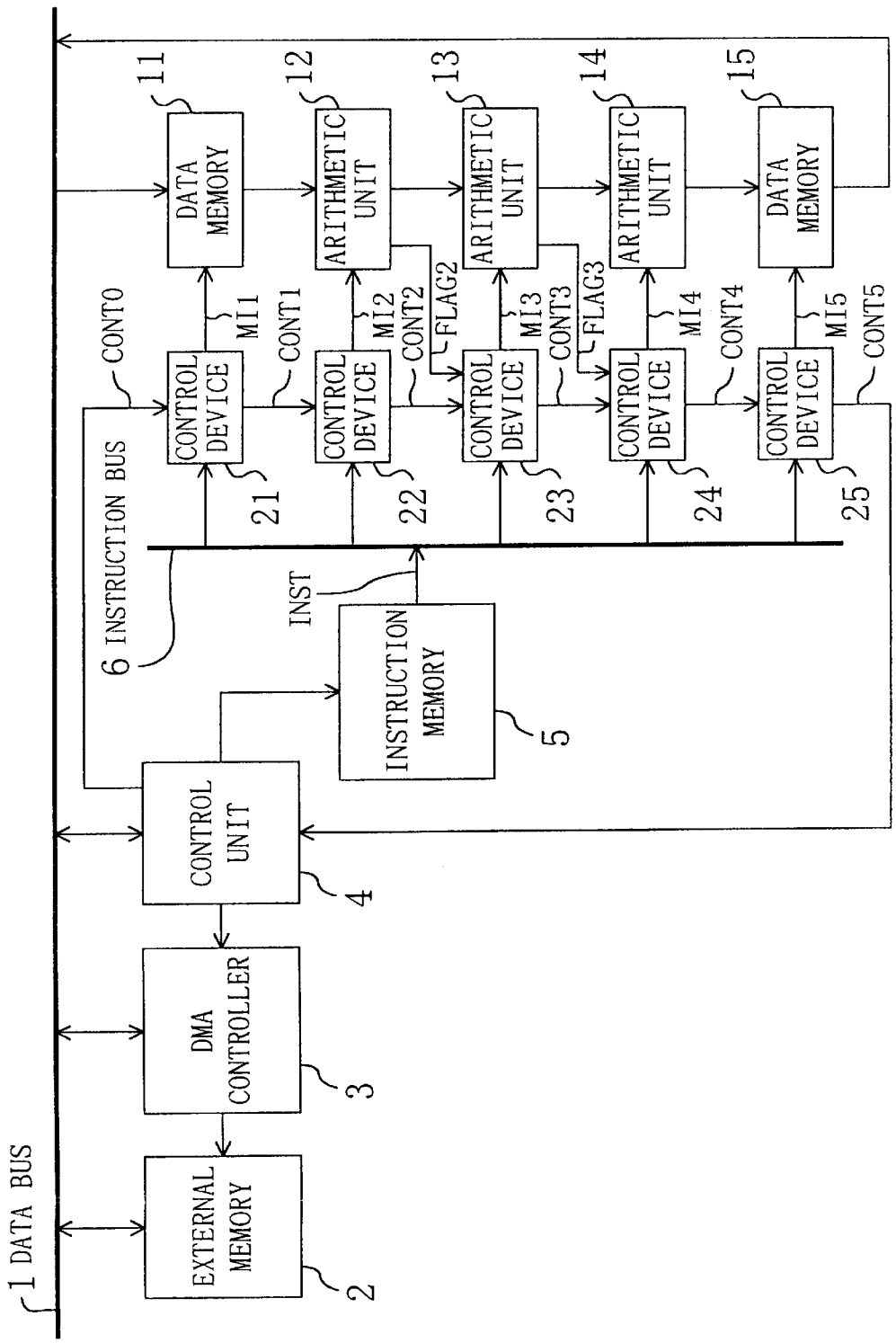
FIG. 1 is a block diagram showing a structure of the data processor in accordance with the present invention.

FIG. 1 illustrates a data processor in accordance with the present invention. The data processor of FIG. 1 has a data bus 1, an external memory 2, a DMA controller 3, a control unit 4, an instruction memory 5, an instruction bus 6, a data memory 11, three arithmetic units 12–14, a data memory 15, and five control devices 21–25. The control unit 4 is implemented by a CPU (central processing unit) for controlling the entire data processor of FIG. 1. The external memory 2 stores data signals representative of operands upon which arithmetic operations are performed. A data signal stored in the external memory 2 is sent to the data memory 11 through the data bus 1 under the control of the DMA controller 3 based on an instruction from the control unit 4. The control unit 4 instructs the instruction memory 5 to send an instruction INST to each of the control devices 21–25 over the instruction bus 6. If one control device receives an instruction INST carrying the same address that the control device is assigned, the control device holds a micro instruction contained in the received instruction INST. The data memory 11, the three arithmetic units 12–14, and the data memory 15 (the five processing units) are connected in cascade so as to form a first path which extends from the data bus 1 and returns to the data bus 1. These five processing units 11–15 together form an arithmetic pipeline for, for example, video and audio data signal processing. The five control devices 21–25 are connected in cascade so as to form a second path which extends from the control unit 4 and returns to the control unit 4. These five processing units 21–25 together form a control pipeline for controlling the five processing units 11–15.

Details of the above will be described. The data memory 11 and the control device 21 together form a first stage processing component having a first input disposed on the first path and a second input disposed on the second path. The data memory 11 stores data signals supplied from the data bus 1 through the first input and performs a processing operation of sending to the arithmetic unit 12 a data signal designated by a micro instruction (for example, a LOAD instruction) MI1. Upon the detection of a processing start request bit in a control signal CONT0 supplied from the control unit 4 through the second input, the control device 21 starts to send the micro instruction MI1 to the data memory 11 and sends to the control device 22 a control signal CONT1 which lags the control signal CONT0 by a number of cycles required to complete the processing operation of the data memory 11.

The arithmetic unit 12 and the control device 22 together form a second stage processing component having a first input disposed on the first path and a second input disposed on the second path. The arithmetic unit 12 performs a processing operation on the data signal supplied from the data memory 11 through the first input according to a micro instruction MI2 and sends to the arithmetic unit 13 a data signal representative of a result of the processing operation. The arithmetic unit 12 has the function to send to the control device 23 a flag signal FLAG2 indicative of an exception occurrence. Upon the detection of a processing start request bit of the control signal CONT1 supplied from the control device 21 through the second input, the control device 22 starts to send the micro instruction MI2 to the arithmetic unit 12 and sends to the control device 23 a control signal CONT2 which lags the control signal CONT1 by a number of cycles required to complete the processing operation of the arithmetic unit 12.

The arithmetic unit 13 and the control device 23 together form a third stage processing component having a first input disposed on the first path and a second input disposed on the second path. The arithmetic unit 13 performs a processing operation on the data signal supplied from the arithmetic unit 12 through the first input according to a micro instruction MI3 and sends to the arithmetic unit 14 a data signal representative of a result of the processing operation. The arithmetic unit 13 has the function of sending to the control device 24 a flag signal FLAG3 indicative of an exception occurrence. Upon the detection of a processing start request bit of the control signal CONT2 supplied from the control device 22 through the second input, the control device 23 starts to send the micro instruction MI3 to the arithmetic unit 13 and sends to the control device 24 a control signal CONT3 which lags the control signal CONT2 by a number of cycles required to complete the processing operation of the arithmetic unit 13. The control device 23 has an additional function of changing the micro instruction MI3 when the flag signal FLAG2 is asserted.

The arithmetic unit 14 and the control device 24 together form a fourth stage processing component having a first input disposed on the first path and a second input disposed on the second path. The arithmetic unit 14 performs a processing operation on the data signal supplied from the arithmetic unit 13 through the first input according to a micro instruction MI4 and sends to the data memory 15 a data signal representative of a result of the processing operation. Upon the detection of a processing start request bit of the control signal CONT3 supplied from the control device 23 through the second input, the control device 24 starts to send the micro instruction MI4 to the arithmetic unit 14 and sends to the control device 25 a control signal CONT4 which lags the control signal CONT3 by a number of cycles required to complete the processing operation of the arithmetic unit 14. The control device 24 has an additional function of changing the micro instruction MI4 when the flag signal FLAG3 is asserted.

The data memory 15 and the control device 25 together form a fifth stage processing component having a first input disposed on the first path and a second input disposed on the second path. The data memory 15 stores the data signal supplied from the arithmetic unit 14 through the first input according to a micro instruction (for example, a STORE instruction) MI5. The data memory 15 has another function of sending the stored data signal to the data bus 1. Upon the detection of a processing start request bit of the control signal CONT4 supplied from the control device 24 through the second input, the control device 25 starts to send the micro instruction MI5 to the data memory 15 and sends to the control unit 4 a control signal CONT5 which lags the control signal CONT4 by a number of cycles required to complete the processing operation of the data memory 15.

FIG. 2 shows fields of the instruction INST read out from the instruction memory 5 of FIG. 1. The instruction INST has six fields, namely a first to a sixth field 31–36. The first field 31 is used to indicate an address ADRS which designates one of the five control devices 21–25 which are assigned respective addresses (i.e., five different addresses #1–#5). The control devices 22–24 each have six micro instruction registers, as will be described later, and the second field 32 is used to provide an index INDEX which indicates one of the six micro instruction registers of the control device designated by the address ADRS. The third field 33 is used to indicate a number of cycles (hereinafter referred to as the cycle number CYCLE) required to complete a processing operation of a corresponding one of the five processing units 11–15 to the control device designated by the address ADRS. The data processor of FIG. 1 is able to automatically execute a series of processing operations a give number of times, as will be described later. The fourth field 34 is used to indicate a pipeline pitch PITCH representative of the maximum of the numbers of cycles required to complete the processing operations of the five processing units 11–15. The fifth field 35 is used to indicate a repeat count REPEAT indicative of how many times a series of operation is carried out in the five processing units 11–15. Finally, the sixth field 36 is used to indicate a micro instruction MINST.

FIG. 3 shows fields of each of the six control signals CONT0–CONT5 of FIG. 1. Each control signal CONT0–CONT5 is composed of a first field 41, a second field 42, and a third field 43. The first field 41 is a processing start request bit START, the second field 42 is a mode bit MODE representative of either of a mode A and a mode B (MODE=0 in the mode A; MODE=1 in the mode B), and the third field 43 is a processing end request bit END. The six micro instruction registers of each of the control devices 22–24 is divided into a first group of three micro instruction registers (#0–#2) and a second group of another three micro registers (#3–#5), as will be described later. In the mode A, the three micro instruction registers #0–#2 are selected, while in the mode B, the three micro instruction registers #3–#5 are selected.

Figure 4:
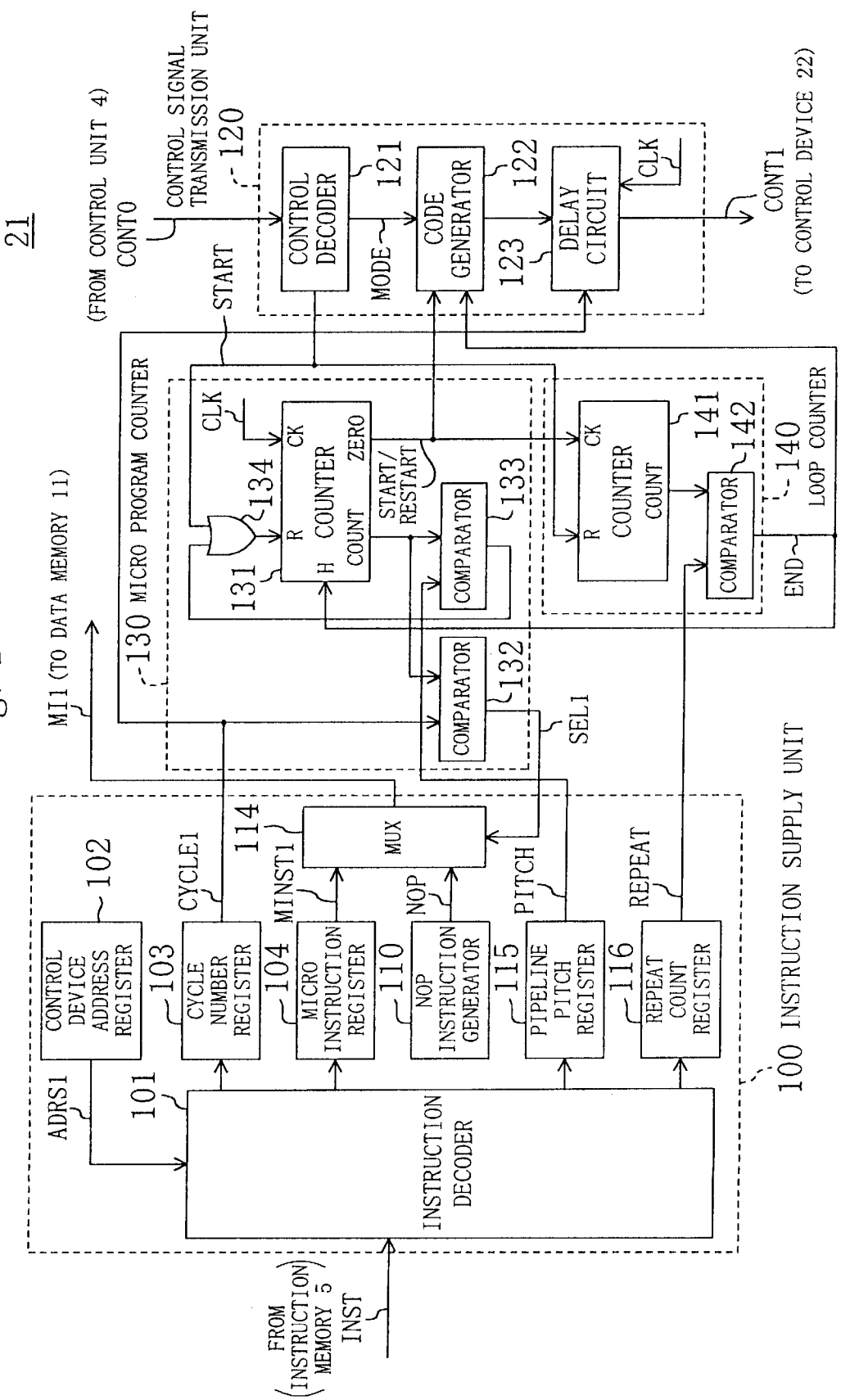
FIG. 4 is a block diagram showing details of a structure of the first stage control device of FIG. 1.

Referring now to FIG. 4, the first stage control device 21 of FIG. 1 will be described in detail. The control device 21 has an instruction supply unit 100, a control signal transmission unit 120, a micro program counter 130, and a loop counter 140.

The instruction supply unit 100 has an instruction decoder 101 for decoding the instruction INST read out from the instruction memory 5 and a control device address register 102 for storing an address ANDRS1 assigned to the control device 21. If a correspondence exists between the address ADRS designated in the instruction INST and the address ADRS1 stored in the control device address register 102, the instruction decoder 101 accepts the third to sixth fields 33–36 in the instruction INST. In addition to the instruction decoder 101 and the control device address register 102, the instruction supply unit 100 further has a cycle number register 103 for storing a cycle number CYCLE1 obtained from the instruction decoder 101, a micro instruction register 104 for storing a micro instruction MINST1 obtained from the instruction decoder 101, a NOP (no-operation) instruction generator 110 for generating a NOP instruction, a multiplexer 114 for selecting between the NOP instruction generated in the NOP instruction generator 110 and the micro instruction MINST1 stored in the micro instruction register 104 and for sending the selected instruction to the data memory 11, a pipeline pitch register 115 for storing the pipeline pitch PITCH obtained from the instruction decoder 101, and a repeat count register 116 for storing the repeat count REPEAT obtained from the instruction decoder 101.

The control signal transmission unit 120 has a control decoder 121, a code generator 122, and a delay circuit 123. The control decoder 121 decodes the control signal CONT0 supplied from the control unit 4 so as to detect the processing start request bit START of the control signal CONT0. The mode bit MODE of the control signal CONT0 is provided intact to the code generator 122 from the control decoder 121. The code generator 122 is disposed to generate a code for a new control signal based on a processing start request START/RESTART received from the micro program counter 130, based on the mode bit MODE received from the control decoder 121, and based on a processing end request END received from the loop counter 140, which is described more concretely. The processing start request bit START is asserted whenever the code generator 122 receives the processing start request START/RESTART from the micro program counter 130, and the processing end request bit END is asserted whenever the code generator 122 receives the processing end request END from the loop counter 140. Based on a clock signal CLK, the delay circuit 123 sends to the control device 22 the control signal CONT1 which lags the control signal generated by the code generator 122 by the cycle number CYCLE1 stored in the cycle number register 103.

The micro program counter 130 has a counter 131 for counting pluses of the clock signal CLK, a first comparator 132 for comparing a count value that the counter 131 has reached with the cycle number CYCLE1 stored in the cycle number register 103, a second comparator 133 for comparing the count value of the counter 131 with the pipeline pitch PITCH stored in the pipeline pitch register 115, and an OR gate 134. The loop counter 140 has a counter 141 for counting pulses (pulses of the processing start request START/RESTART) supplied whenever the counter 131 is reset to 0 and a comparator 142 for comparing a count value that the counter 141 has reached with the repeat count REPEAT stored in the repeat count register 116. The counter 131 is reset by output from the OR gate 134. In other words, when the control decoder 121 detects the processing start request bit START of the control signal CONT0 or when the comparator 133 detects that a correspondence exists between the count value of the counter 131 and the pipeline pitch PITCH stored in the pipeline pitch register 115, the counter 131 is reset, and the processing start request START/RESTART is delivered to the code generator 122 and to the counter 141 whenever the counter 131 is reset. Micro instruction selection by the multiplexer 114 is controlled according to a signal SEL1 representative of a result of the comparison operation of the comparator 132. The counter 141 is reset at the time the control decoder 121 detects the processing start request bit START of the control signal CONT0. When the comparator 142 detects that a correspondence exists between the count value of the counter 141 and the repeat count REPEAT stored in the repeat count register 116, the processing end request END is sent to the code generator 122 and a hold terminal of the counter 131 is made active so that the counter 131 is prevented from being updated.

Figure 5:
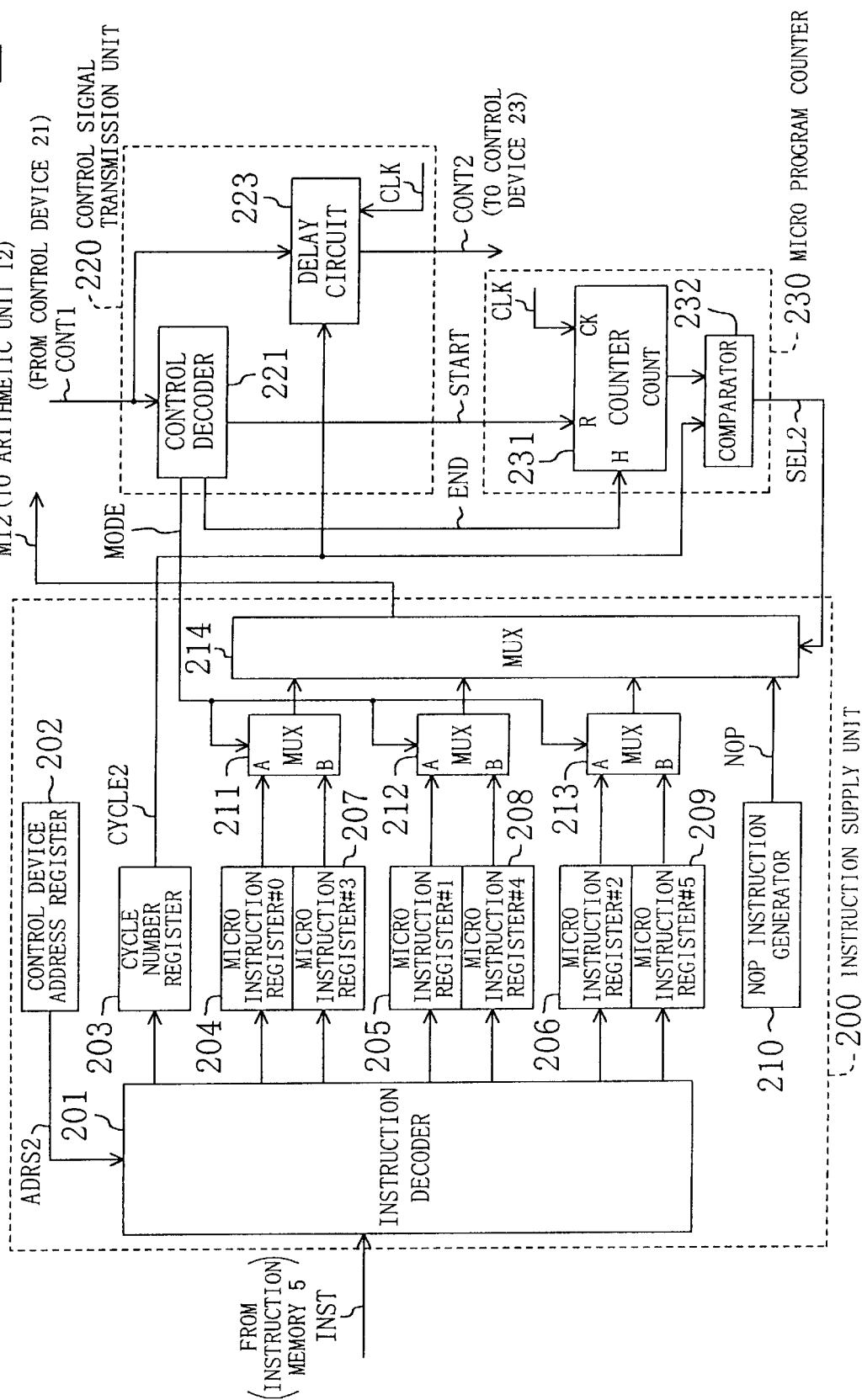
FIG. 5 is a block diagram showing details of a structure of the second stage control device of FIG. 1.

Referring now to FIG. 5, the second stage control device 22 of FIG. 1 will be described in detail. The control device 22 has an instruction supply unit 200, a control signal transmission unit 220, and a micro program counter 230.

The instruction supply unit 200 has an instruction decoder 201 for decoding the instruction INST read out from the instruction memory 5, a control device address register 202 for storing an address ANDRS2 assigned to the control device 22, and six micro instruction registers (#0–#5) 204–209 for storing respective micro instructions obtained from the instruction decoder 201. When a correspondence exists between the address ADRS designated in the instruction INST and the address ANDRS2 stored in the control device address register 202, the instruction decoder 201 accepts the second, third, and sixth fields 32, 33, and 36. The instruction decoder 201 has an additional function of storing a micro instruction obtained from the instruction INST in a particular one of the six micro instruction registers (#0–#5) 204–209 that is indicated by the index INDEX of the instruction INST. The three micro instruction registers (#0–#2) 204–206 together form a first group which are selected in the mode A, while the remaining three micro instruction registers (#3–#5) 207–209 together form a second group which are selected in the mode B. The instruction supply unit 200 further has the following components: a cycle number register 203 for storing a cycle number CYCLE2 obtained from the instruction decoder 201; a NOP instruction generator 210 for generating a NOP instruction; a multiplexer 211 for selecting between the micro instruction stored in the micro instruction register (#0) 204 belonging in the first group and the micro instruction stored in the micro instruction register (#3) 207 belonging in the second group according to the mode bit MODE; a multiplexer 212 for selecting between the micro instruction stored in the micro instruction register (#1) 205 belonging in the first group and the micro instruction stored in the micro instruction register (#4) 208 belonging in the second group according to the mode bit MODE; a multiplexer 213 for selecting between the micro instruction stored in the micro instruction register (#2) 206 belonging in the first group and the micro instruction stored in the micro instruction register (#5) 209 belonging in the second group according to the mode bit MODE; and a multiplexer 214 for selecting between the NOP instruction generated by the NOP instruction generator 210 and one of the micro instructions selected by the multiplexers 211–213 and for sending the selected instruction to the arithmetic unit 12.

The control signal transmission unit 220 has a control decoder 221 and a delay circuit 223. The control decoder 221 decodes the control signal CONT1 supplied from the control device 21 so as to detect the bits START, MODE, and END of the control signal CONT1. Based on the clock signal CLK, the delay circuit 223 sends to the control device 23 the control signal CONT2 which lags the control signal CONT1 supplied from the control device 21 by the cycle number CYCLE2 stored in the cycle number register 203. The mode bit MODE, detected by the control decoder 221, is sent to each of the multiplexers 211–213.

The micro program counter 230 has a counter 231 for counting pulses of the clock signal CLK and a comparator 232 for comparing a count value that the counter 231 has reached and the cycle number CYCLE2 stored in the cycle number register 203. The counter 231 is reset whenever the control decoder 221 detects the processing start request bit START of the control signal CONT1. Micro instruction selection by the multiplexer 214 is controlled according to a signal SEL2 representative of a result of the comparison operation of the comparator 232. If the control decoder 221 detects the processing end request bit END of the control signal CONT1, a hold terminal of the counter 231 is made active so that the counter 231 is prevented from being updated.

Figure 6:
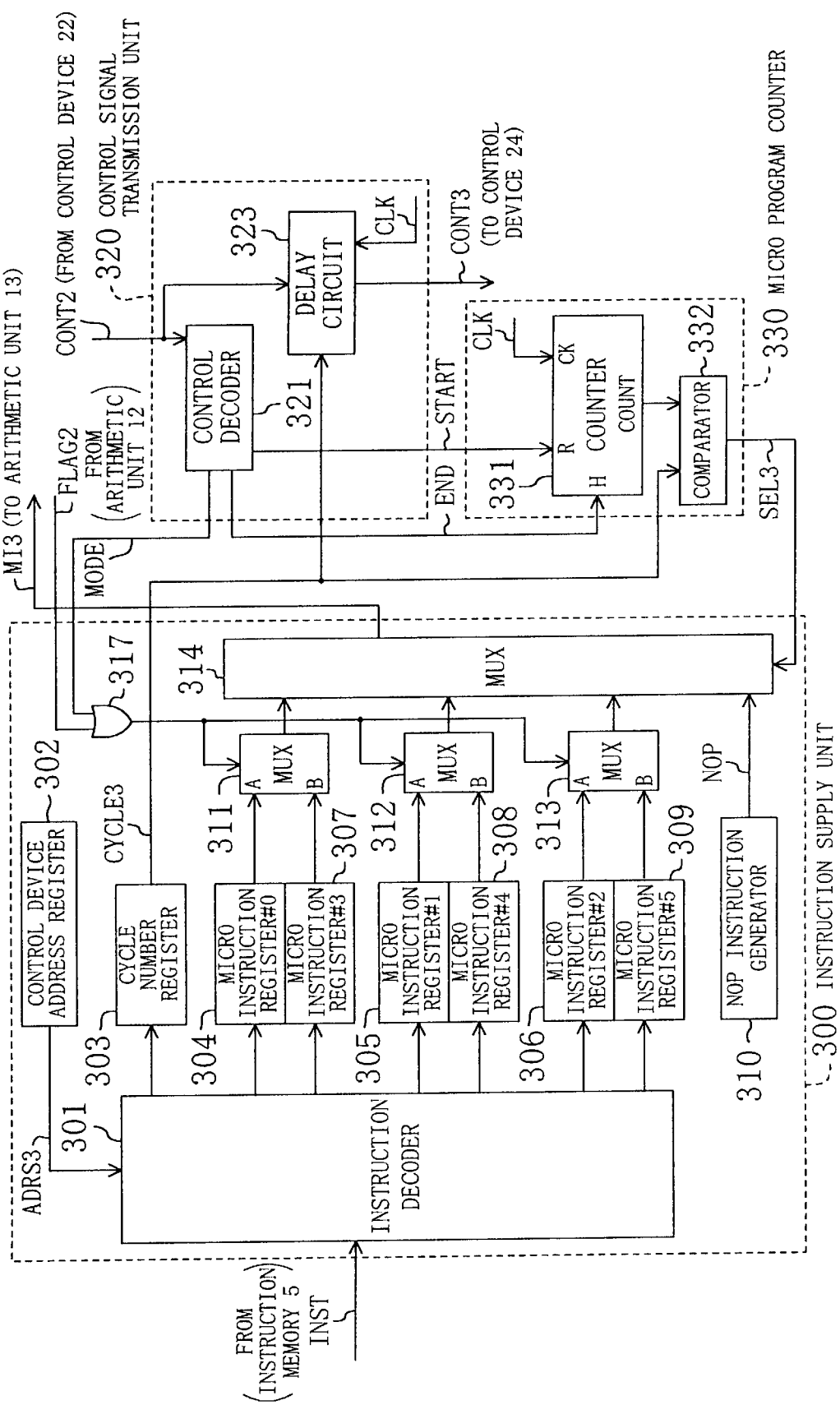
FIG. 6 is a block diagram showing details of a structure of the third stage control device of FIG. 1.

Referring now to FIG. 6, the third stage control device 23 will be described in detail. The control device 23 has an instruction supply unit 300, a control signal transmission unit 320, and a micro program counter 330.

The instruction supply unit 300 has an instruction decoder 301 for decoding the instruction INST read out from the instruction memory 5, a control device address register 302 for storing an address ANDRS3 assigned to the control device 23, and six micro instruction registers (#0–#5) 304–309 for storing respective micro instructions obtained from the instruction decoder 301. When a correspondence exists between the address ADRS designated in the instruction INST and the address ANDRS3 stored in the control device address register 302, the instruction decoder 301 accepts the second, third, and sixth fields 32, 33, and 36 in the instruction INST. The instruction decoder 301 has an additional function of storing a micro instruction obtained from the instruction INST in a particular one of the six micro instruction registers (#0–#5) 304–309 that is indicated by the index INDEX in the instruction INST. The three micro instruction registers (#0–#2) 304–306 together form a first group which are selected in the mode A and the remaining three micro instruction registers (#3–#5) 307–309 together form a second group which are selected in the mode B. The instruction supply unit 300 further has the following components: a cycle number register 303 for storing a cycle number CYCLE3 obtained from the instruction decoder 301; a NOP instruction generator 310 for generating a NOP instruction; a multiplexer 311 for selecting between the micro instruction stored in the micro instruction register (#0) 304 belonging in the first group and the micro instruction stored in the micro instruction register (#3) 307 belonging in the second group; a multiplexer 312 for selecting between the micro instruction stored in the micro instruction register (#1) 305 belonging in the first group and the micro instruction stored in the micro instruction register (#4) 308 belonging in the second group; a multiplexer 313 for selecting between the micro instruction stored in the micro instruction register (#2) 306 belonging in the first group and the micro instruction stored in the micro instruction register (#5) 309 belonging in the second group; a multiplexer 314 for selecting between the NOP instruction generated by the NOP instruction generator 310 and one of the micro instructions selected by the multiplexers 311–313 and for sending the selected instruction to the arithmetic unit 13, and an OR gate 317 for controlling micro instruction selection in the multiplexers 311–313 according to the mode bit MODE of the control signal CONT2 supplied from the control device 22 and according to the flag signal FLAG2 supplied from the arithmetic unit 12.

The control signal transmission unit 320 has a control decoder 321 and a delay circuit 323. The control decoder 321 decodes the control signal CONT2 supplied from the control device 22 so as to detect the bits START, MODE, and END of the control signal CONT2. Based on the clock signal CLK, the delay circuit 323 sends to the control device 24 the control signal CONT3 which lags the control signal CONT2 supplied from the control device 22 by the cycle number CYCLE3 stored in the cycle number register 303. The mode bit MODE, detected by the control decoder 321, is sent to the OR gate 317.

The micro program counter 330 has a counter 331 for counting pulses of the clock signal CLK and a comparator 332 for comparing a count value that the counter 331 has reached and the cycle number CYCLE3 stored in the cycle number register 303. The counter 331 is reset whenever the control decoder 321 detects the processing start request bit START of the control signal CONT2. Micro instruction selection by the multiplexer 314 is controlled according to a signal SEL3 representative of a result of the comparison operation of the comparator 332. When the control decoder 321 detects the processing end request bit END of the control signal CONT2, a hold terminal of the counter 331 is made active so that the counter 331 is prevented from being updated.

Figure 7:
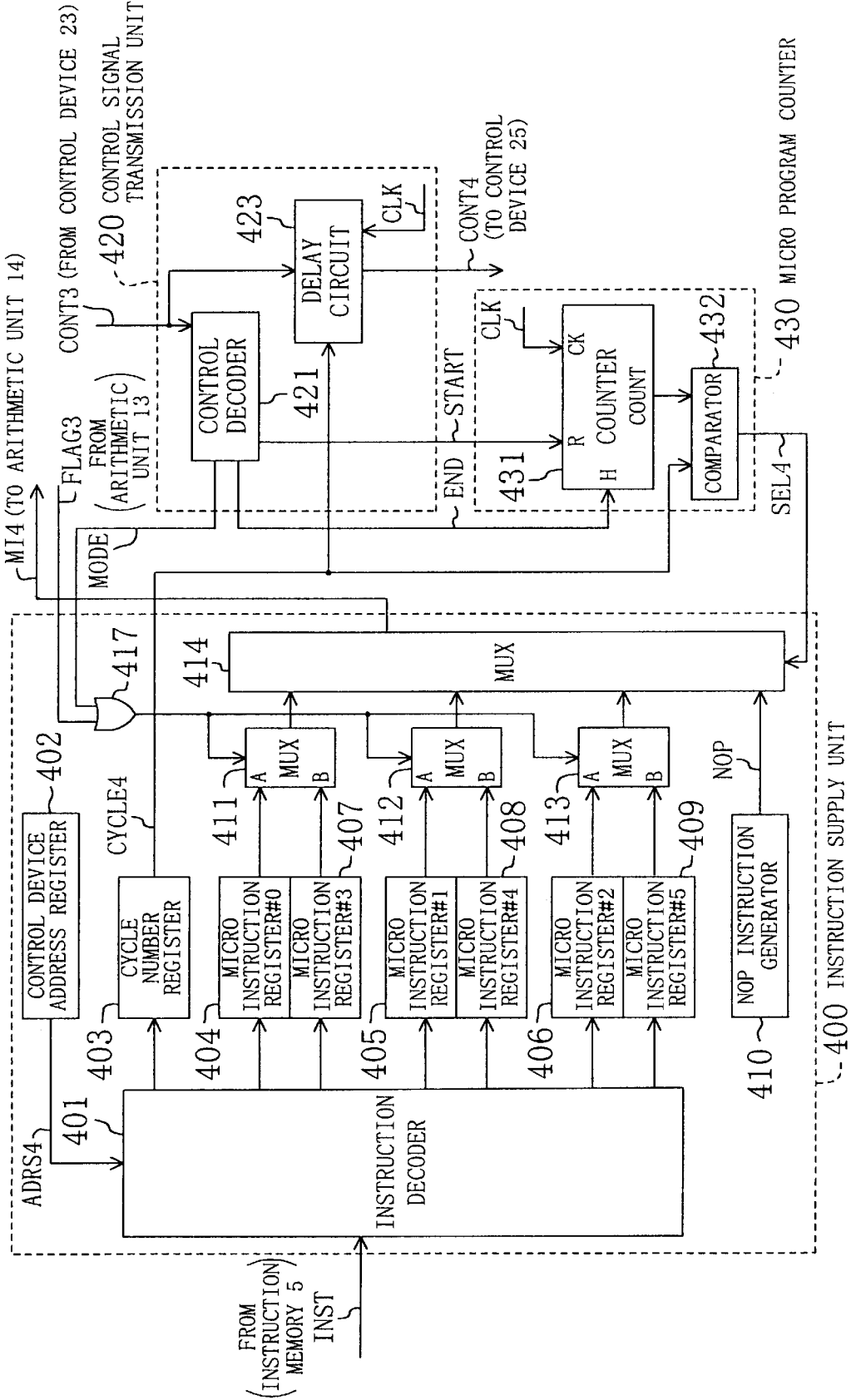
FIG. 7 is a block diagram showing details of a structure of the fourth stage control device of FIG. 1.

Referring now to FIG. 7, the fourth stage control device 24 will be described in detail. The control device 24 has an instruction supply unit 400, a control signal transmission unit 420, and a micro program counter 430.

The instruction supply unit 400 has an instruction decoder 401 for decoding the instruction INST read out from the instruction memory 5, a control device address register 402 for storing an address ANDRS4 assigned to the control device 24, and six micro instruction registers (#0–#5) 404–409 for storing respective micro instructions obtained from the instruction decoder 401. When there exists a correspondence between the address ADRS designated in the instruction INST and the address ANDRS4 stored in the control device address register 402, the instruction decoder 401 accepts the second, third, and sixth fields 32, 33, and 36 of the instruction INST. The instruction decoder 401 has an additional function of storing a micro instruction obtained from the instruction INST in a particular one of the six micro instruction registers (#0–#5) 404–409 that is indicated by the index INDEX of the instruction INST. The three micro instruction registers (#0–#2) 404–406 together form a first group which are selected in the mode A and the remaining three micro instruction registers (#3–#5) 407–409 together form a second group which are selected in the mode B. The instruction supply unit 400 further has the following components: a cycle number register 403 for storing a cycle number CYCLE4 obtained from the instruction decoder 401; a NOP instruction generator 410 for generating a NOP instruction; a multiplexer 411 for selecting between the micro instruction stored in the micro instruction register (#0) 404 belonging in the first group and the micro instruction stored in the micro instruction register (#3) 407 belonging in the second group; a multiplexer 412 for selecting between the micro instruction stored in the micro instruction register (#1) 405 belonging in the first group and the micro instruction stored in the micro instruction register (#4) 408 belonging in the second group; a multiplexer 413 for selecting between the micro instruction stored in the micro instruction register (#2) 406 belonging in the first group and the micro instruction stored in the micro instruction register (#5) 409 belonging in the second group; a multiplexer 414 for selecting between the NOP instruction generated by the NOP instruction generator 410 and one of the micro instructions selected by the multiplexers 411–413 and for sending the selected instruction to the arithmetic unit 14, and an OR gate 417 for controlling micro instruction selection in the multiplexers 411–413 according to the mode bit MODE of the control signal CONT3 supplied from the control device 23 and according to the flag signal FLAG3 supplied from the arithmetic unit 13.

The control signal transmission unit 420 has a control decoder 421 and a delay circuit 423. The control decoder 421 decodes the control signal CONT3 supplied from the control device 23 so as to detect the bits START, MODE, and END of the control signal CONT3. Based on the clock signal CLK, the delay circuit 423 sends to the control device 25 the control signal CONT4 which lags the control signal CONT3 supplied from the control device 23 by the cycle number CYCLE4 stored in the cycle number register 403. The mode bit MODE, detected by the control decoder 421, is supplied to the OR gate 417.

The micro program counter 430 has a counter 431 for counting pulses of the clock signal CLK and a comparator 432 for comparing a count value that the counter 431 has reached with the cycle number CYCLE4 stored in the cycle number register 403. The counter 431 is reset whenever the control decoder 421 detects the processing start request bit START of the control signal CONT3. Micro instruction selection by the multiplexer 414 is controlled according to a signal SEL4 representative of a result of the comparison operation of the comparator 432. When the control decoder 421 detects the processing end request bit END of the control signal CONT3, a hold terminal of the counter 431 is made active so that the counter 431 is prevented from being updated.

Figure 8:
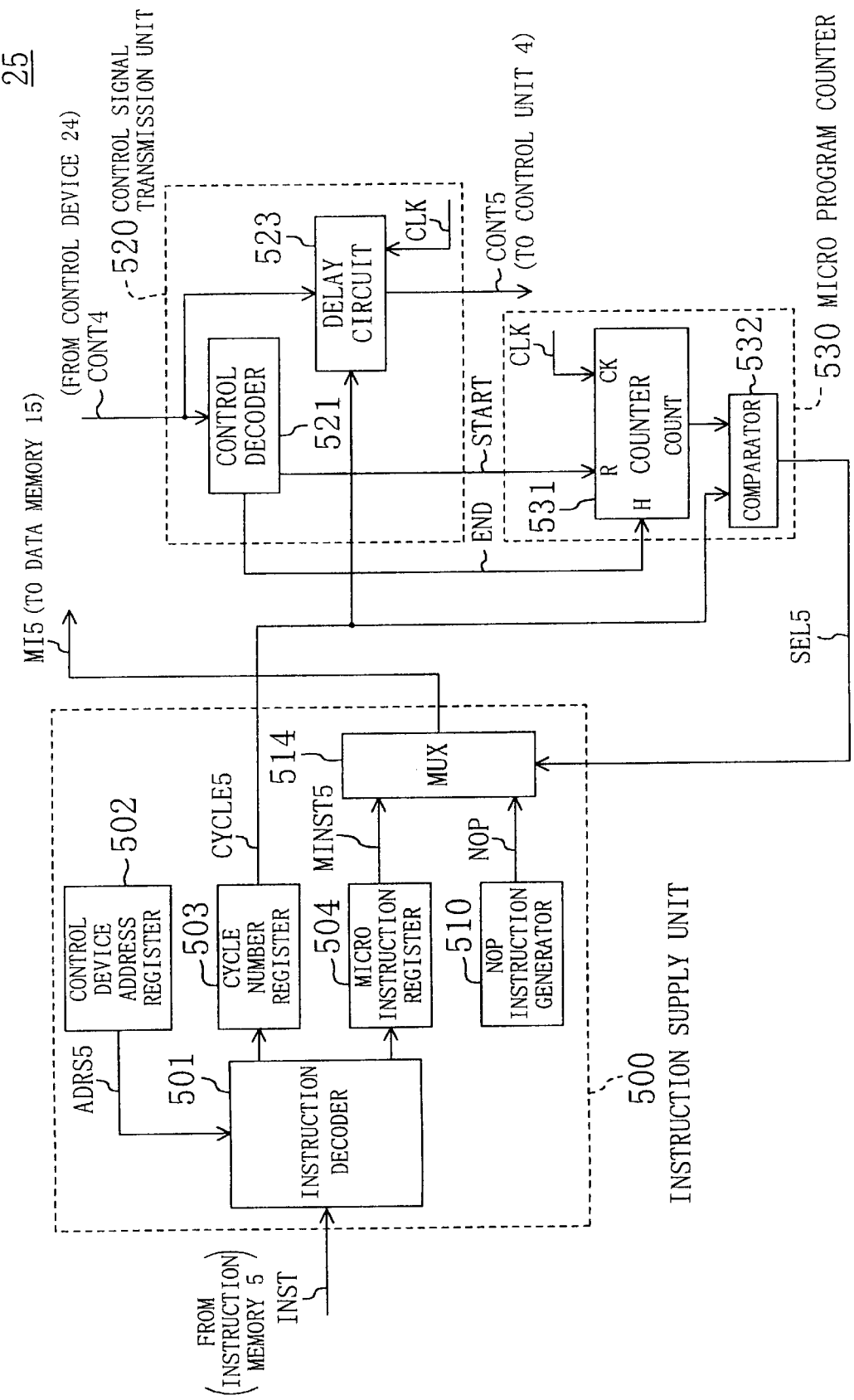
FIG. 8 is a block diagram showing details of a structure of the fifth stage control device of FIG. 1.

Referring to FIG. 8, the fifth stage control device 25 will be described in detail. The control device 25 has an instruction supply unit 500, a control signal transmission unit 520, and a micro program counter 530.

The instruction supply unit 500 has an instruction decoder 501 for decoding the instruction INST read out from the instruction memory 5 and a control device address register 502 for storing an address ANDRS5 assigned to the control device 25. When there exists a correspondence between the address ADRS designated in the instruction INST and the address ANDRS5 stored in the control device address register 502, the instruction decoder 501 accepts the third and sixth fields 33 and 36 of the instruction INST. The instruction supply unit 500 further has the following components: a cycle number register 503 for storing a cycle number CYCLE5 obtained from the instruction decoder 501; a micro instruction register 504 for storing a micro instruction MINST5 obtained from the instruction decoder 501, a NOP instruction generator 510 for generating a NOP instruction, and a multiplexer 514 for selecting between the NOP instruction generated by the NOP instruction generator 510 and the micro instruction MINST5 stored in the micro instruction register 504 and for sending the selected instruction to the data memory 15.

The control signal transmission unit 520 has a control decoder 521 and a delay circuit 523. The control decoder 521 decodes the control signal CONT4 supplied from the control device 24 so as to detect the bits START and END of the control signal CONT4. Based on the clock signal CLK, the delay circuit 523 sends to the control unit 4 the control signal CONT5 which lags the control signal CONT4 supplied from the control device 24 by the cycle number CYCLE5 stored in the cycle number register 503.

The micro program counter 530 has a counter 531 for counting pulses of the clock signal CLK and a comparator 532 for comparing a count value that the counter 531 has reached with the cycle number CYCLE5 stored in the cycle number register 503. The counter 531 is reset whenever the control decoder 521 detects the processing start request bit START of the control signal CONT4. Micro instruction selection by the multiplexer 514 is controlled according to a signal SEL5 representative of a result of the comparison operation by the comparator 532. When the control decoder 521 detects the processing end request bit END of the control signal CONT4, a hold terminal of the counter 531 is made active so that the counter 531 is prevented from being updated.

Figure 9:
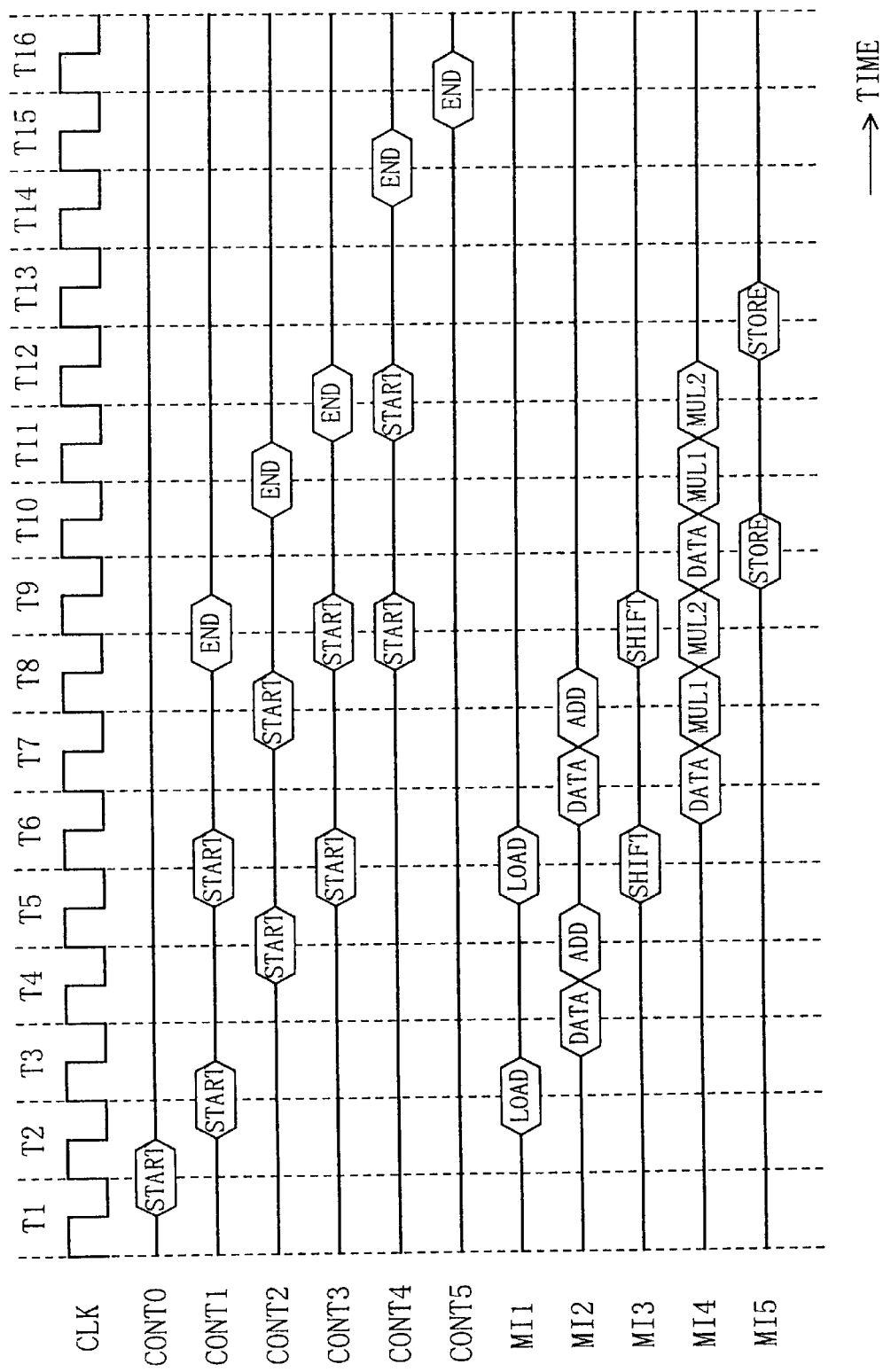
FIG. 9 is a time chart diagram showing an example of the operation of the data processor of FIG. 1.

FIG. 9 shows an example of the operation of the data processor of FIG. 1, wherein the arithmetic units 12–14 operate as an adder, as a right shifter, and as a multiplier respectively, and a series of processing operations is carried out. Such a series of processing operations includes (a) adding a constant E and a data variable X read out from the data memory 11, (b) shifting a result Y of the addition operation to the right by 2 bit positions, and (c) writing to the data memory 15 a data variable W representative of a result obtained by multiplying a result Z of the shift operation and a constant F. In the example of FIG. 9, such a series of processing operations is carried out twice. The numbers of cycles, respectively required by the data memory 11, the arithmetic units 12–14, and the data memory 15 to complete their individual processing operations, are 1, 2, 1, 3, and 1 respectively. The maximum of these cycle numbers, or the pipeline pitch is 3. T1–T16 of FIG. 9 each represent one machine cycle according to the frequency of the clock signal CLK.

Prior to starting data processing, the control unit 4 directs the instruction memory 5 to repeatedly supply the instruction INST, whereby the following registers initial settings of the five instruction supply units 100, 200, 300, 400, and 500 are carried out. In the instruction supply unit 100 for the data memory 11, the cycle number register 103 stores a numeric value of 1, the micro instruction register 104 stores a LOAD instruction, the pipeline pitch register 115 stores a numeric value of 3, and the repeat count register 116 stores a numeric value of 2. In the instruction supply unit 200 for the arithmetic unit 12, the cycle number register 203 stores a numeric value of 2, the micro instruction register (#0) 204 stores a DATA word representative of the constant E, and the micro instruction register (#1) 205 stores an ADD instruction. In the instruction supply unit 300 for the arithmetic unit 13, the cycle number register 303 stores a numeric value of 1 and the micro instruction register (#0) 304 stores a SHIFT instruction. In the instruction supply unit 400 for the arithmetic unit 14, the cycle number register 403 stores a numeric value of 3, the micro instruction register (#0) 404 stores a DATA word representative of the constant F, the micro instruction register (#1) 405 stores a MUL1 (first-part multiplication) instruction, and the micro instruction register (#2) 406 stores a MUL2 (second-part multiplication) instruction. Finally, in the instruction supply unit 500 for the data memory 15, the cycle number register 503 stores a numeric value of 1 and the micro instruction register 504 stores a STORE instruction.

After the foregoing register initial settings, the control unit 4 directs the DMA controller 3 so that two data variables, X(1) and X(2), are transferred to the data memory 11 from the external memory 2. As shown in FIG. 9, at cycle T1 the control signal CONT0, in which the processing start request bit START is asserted, the mode bit MODE designates the mode A, and the processing end request bit END is negated, is sent to the first stage control device 21.

In the first stage control device 21, at cycle T1 the control decoder 121 detects an assertion of the processing start request bit START of the control signal CONT0, as a result of which both of the two counters 131 and 141 are reset to 0. At this time, a pulse of the processing start request START/RESTART is sent to the code generator 122 from the counter 131, as a result of which the code generator 122 generates a new control signal identical in contents with the control signal CONT0. At cycle T2, the delay circuit 123 sends to the second stage control device 22 the control signal CONT1 which lags the control signal including the processing start request bit START asserted by the code generator 122 by one cycle according to the value of the cycle number CYCLE1 stored in the cycle number register 103 (i.e., 1). Meanwhile, the counter 131 is updated to 1 at the time the cycle T2 begins and to 2 at the time the cycle T3 begins. According to the value of the cycle number CYCLE1 stored in the cycle number register 103 (i.e., 1), the comparator 132 causes the multiplexer 114 to select the LOAD instruction (if the counter 131 is at 1) or the NOP instruction (if the counter 131 is at a value other than 1). Therefore, the control device 21 sends, as the micro instruction MI1, the NOP instruction, the LOAD instruction and the NOP instruction at cycle T1, at cycle T2, and at cycle T3 respectively, to the data memory 11. In FIG. 9, no NOP instructions are shown. Upon receipt of the LOAD instruction, the data memory 11 sends the data variable X(1) to the arithmetic device 12.

When the counter 131 is updated to 3 at the time the cycle T4 begins, the comparator 133 detects a correspondence between the count value of the counter 131 and the value of the pipeline pitch PITCH stored in the pipeline pitch register 115 (i.e., 3). As a result, the counter 131 is instantly reset to 0. A pulse of the processing start request START/RESTART is sent to the code generator 122 and to the counter 141 from the counter 131 at cycle T4, as a result of which the code generator 122 generates a new control signal and the counter 141 is updated to 1. At cycle T5, the delay circuit 123 sends to the second stage control device 22 the control signal CONT1 which lags the control signal including the processing start request bit START asserted by the code generator 122 by one cycle. Meanwhile, the counter 131 is updated to 1 at the time the cycle T5 begins and to 2 at the time the cycle T6 begins. Therefore, the control device 21 sends, as the micro instruction MI1, the NOP instruction, the LOAD instruction and the NOP instruction at cycle T4, at cycle T5, and at cycle T6 respectively, to the data memory 11. Upon receipt of the LOAD instruction, the data memory 11 sends the data variable X(2) to the arithmetic device 12.

The counter 131 is reset to 0 by output from the comparator 133 soon after the counter 131 is updated to 3 at the time the cycle T7 begins. Accordingly, at cycle T7 a pulse of the processing start request START/RESTART is sent to the counter 141 from the counter 131. As a result, the counter 141 is updated to 2. In this way, when the counter 141 is updated to 2, the comparator 141 detects a correspondence between the count value of the counter 141 and the value of the repeat count REPEAT stored in the repeat count register 116 (i.e., 2). As a result, the processing end request END is instantly asserted. At cycle T7, the asserted processing end request END is sent to the code generator 122 and to the counter 131 from the comparator 142, as a result of which the code generator 122 generates a new control signal and the counter 131 is held at 0. At cycle T8, the delay circuit 123 sends to the second stage control device 22 the control signal CONT1 which lags the control signal including the processing end request bit END asserted in the code generator 122 by one cycle.

As described above, at cycles T2 and T5 the LOAD instruction is sent to the data memory 11 from the control device 21. At cycles T2 and T5 the asserted processing start request bit START is sent to the second stage control device 22 from the first stage control device 21. At cycle T8 the asserted processing end request bit END is sent to the second stage control device 22 from the first stage control device 21.

In the second stage control device 22, at cycle T2 the control decoder 221 detects an assertion of the processing start request bit START of the control signal CONT1, as a result of which the counter 231 is reset to 0. At cycle T4, the delay circuit 223 sends to the third stage control device 23 the control signal CONT2 which lags the control signal CONT1 containing the processing start request bit START by two cycles according to the value of the cycle number CYCLE2 stored in the cycle number register 203 (i.e., 2). Meanwhile, the multiplexers 211–213 each receive the mode bit MODE designating the mode A from the control decoder 221, as a result of which the micro instructions stored in the first group micro instruction registers (#0–#2) 204–206 are sent to the multiplexer 214. The counter 231 is updated to 1 at the time the cycle T3 begins and to 2 at the time the cycle T4 begins. According to the value of the cycle number CYCLE2 stored in the cycle number register 203 (i.e., 2), the comparator 232 causes the multiplexer 214 to select (a) the DATA word representative of the constant E of the micro instruction register (#0) 204 if the counter 231 is at 1, (b) the ADD instruction of the micro instruction register (#1) 205 if the counter 231 is at 2, or (c) the NOP instruction of the NOP instruction generator 210 if the counter 231 is at a value other than 1 and 2. Therefore, the control device 22 sends, as the micro instruction MI2, the NOP instruction, the DATA word, and the ADD instruction at cycle T2, at cycle T3, and at cycle T4 respectively, to the arithmetic unit 12. Upon receipt of the DATA word and the ADD instruction, the arithmetic unit 12 sends to the arithmetic unit 13 a data variable Y(1) representative of a result obtained by adding X(1) and E.

The control decoder 221 detects an assertion of the processing start request bit START of the control signal CONT1 soon after the counter 231 is updated to 3 at the time the cycle T5 begins, as a result of which the counter 231 is reset to 0. At cycle T7, the delay circuit 223 sends to the third stage control device 23 the control signal CONT2 which lags the control signal CONT1 containing the processing start request bit START by two cycles according to the value of the cycle number CYCLE2 stored in the cycle number register 203 (i.e., 2). Meanwhile, the counter 231 is updated to 1 at the time the cycle T6 begins and to 2 at the time the cycle T7 begins. Therefore, the control device 22 sends, as the micro instruction MI2, the NOP instruction, the DATA word and the ADD instruction at cycle T5, at cycle T6, and at cycle T7 respectively, to the arithmetic unit 12. Upon receipt of the DATA word and the ADD instruction, the arithmetic unit 12 sends to the arithmetic unit 13 a data variable Y(2) representative of a result obtained by adding X(2) and E.

The control decoder 221 detects an assertion of the processing end request bit END of the control signal CONT1 soon after the counter 231 is updated to 3 at the time the cycle T8 begins, as a result of which the counter 231 is held at 3. At cycle T10, the delay circuit 223 sends to the third stage control device 23 the control signal CONT2 which lags the control signal containing the asserted processing end request bit END by two cycles.

As described above, at cycles T3, T4, T6, and T7 the second stage control device 22 sends the foregoing micro instructions to the arithmetic unit 12. At each cycle T4 and T7, the second stage control device 22 sends the asserted processing start request bit START to the third stage control device 23. At cycle T10, the second stage control device 22 sends the asserted processing end request bit END to the third stage control device 23.

In the third stage control device 23, at cycle T4 the control decoder 321 detects an assertion of the processing start request bit START of the control signal CONT2, as a result of which the counter 331 is reset to 0. At cycle T5, the delay circuit 323 sends to the fourth stage control device 24 the control signal CONT3 which lags the control signal CONT2 containing the processing start request bit START by one cycle according to the value of the cycle number CYCLE3 stored in the cycle number register 303 (i.e., 1). Meanwhile, the multiplexers 311–313 each receive the mode bit MODE designating the mode A from the control decoder 321, as a result of which the micro instructions stored in the first group micro instruction registers (#0–#2) 304–306 are sent to the multiplexer 314. The counter 331 is updated to 1 at the time the cycle T5 begins and to 2 at the time the cycle T6 begins. According to the value of the cycle number CYCLE3 stored in the cycle number register 303 (i.e., 1), the comparator 332 causes the multiplexer 314 to select (a) the SHIFT instruction of the micro instruction register (#0) 304 if the counter 331 is at 1 or (b) the NOP instruction of the NOP instruction generator 310 if the counter 331 is at a value other than 1. Therefore, the control device 23 sends, as the micro instruction MI3, the NOP instruction, the SHIFT instruction and the NOP instruction at cycle T4, at cycle T5, and at cycle T6 respectively, to the arithmetic unit 13. Upon receipt of the SHIFT instruction, the arithmetic unit 13 sends to the arithmetic unit 14 a data variable Z(1) representative of a result obtained by shifting the data variable Y(1) by two bit positions to the right.

The control decoder 321 detects an assertion of the processing start request bit START of the control signal CONT2 soon after the counter 331 is updated to 3 at the time the cycle T7 begins, as a result of which the counter 331 is reset to 0. At cycle T8, the delay circuit 323 sends to the fourth stage control device 24 the control signal CONT3 which lags the control signal CONT2 containing the processing start request bit START by one cycle according to the value of the cycle number CYCLE3 stored in the cycle number register 303 (i.e., 1). Meanwhile, the counter 331 is updated to 1 at the time the cycle T8 begins and to 2 at the time the cycle T9 begins. Therefore, the control device 23 sends, as the micro instruction MI3, the NOP instruction, the SHIFT instruction and the NOP instruction at cycle T7, at cycle T8, and at cycle T9 respectively, to the arithmetic unit 13. Upon receipt of the SHIFT instruction, the arithmetic unit 13 sends to the arithmetic unit 14 a data variable Z(2) representative of a result obtained by shifting the data variable Y(2) to the right by two bit positions.

The control decoder 321 detects an assertion of the processing end request bit END of the control signal CONT2 soon after the counter 331 is updated to 3 at the time the cycle T10 begins, as a result of which the counter 331 is held at 3. At cycle T11, the delay circuit 323 sends to the fourth stage control device 24 the control signal CONT3 which lags the control signal containing the asserted processing end request bit END by one cycle.

As described above, at each cycle T5 and T8 the third stage control device 23 sends the SHIFT instruction to the arithmetic unit 13. At each cycle T5 and T8, the third stage control device 23 sends the asserted processing start request bit START to the fourth stage control device 24. At cycle T11, the third stage control device 23 sends the asserted processing end request bit END to the fourth stage control device 24.

In the fourth stage control device 24, at cycle T5 the control decoder 421 detects an assertion of the processing start request bit START of the control signal CONT3, as a result of which the counter 431 is reset to 0. At cycle T8, the delay circuit 423 sends to the fifth stage control device 25 the control signal CONT4 which lags the control signal CONT3 containing the processing start request bit START by three cycles according to the value of the cycle number CYCLE4 stored in the cycle number register 403 (i.e., 3).

Meanwhile, the multiplexers 411–413 each receive the mode bit MODE designating the mode A from the control decoder 421, as a result of which the micro instructions stored in the first group micro instruction registers (#0–#2) 404–406 are sent to the multiplexer 414. The counter 431 is updated to 1 at the time the cycle T6 begins and to 2 at the time the cycle T7 begins. According to the value of the cycle number CYCLE4 stored in the cycle number register 403 (i.e., 3), the comparator 432 causes the multiplexer 414 to select (a) the DATA word (representative of the constant F) of the micro instruction register (#0) 404 if the counter 431 is at 1, (b) the MUL1 instruction of the micro instruction register (#1) 405 if the counter 431 is at 2, (c) the MUL2 instruction of the micro instruction register (#2) 406 if the counter 431 is at 3, or (d) the NOP instruction of the NOP instruction generator 410 if the counter 431 is at a value other than 1, 2, and 3. Therefore, the control device 24 sends, as the micro instruction MI4, the NOP instruction, the DATA word, and the MUL1 instruction at cycle T5, at cycle T6, and at cycle T7 respectively, to the arithmetic unit 14. Upon receipt of the DATA word and the MUL1 instruction, the arithmetic unit 14 performs a first part of a processing operation of multiplying Z(1) and F. When the counter 431 is updated to 3 at the time the cycle T8 begins, the MUL2 instruction is sent to the arithmetic unit 14 from the control device 24. Upon receipt of the MUL2 instruction, the arithmetic unit 14 performs a second part of the multiplication operation and sends a data variable W(1) representative of a result of the multiplication operation, to the data memory 15.

At cycle T8, the control decoder 421 detects an assertion of the processing start request bit START of the control signal CONT3 after the counter 431 is updated to 3, as a result of which the counter 431 is reset to 0. At cycle T11, the delay circuit 423 sends to the fifth stage control device 25 the control signal CONT4 which lags the control signal CONT3 containing the processing start request bit START by three cycles according to the value of the cycle number CYCLE4 stored in the cycle number register 403 (i.e., 3). Meanwhile, the counter 431 is updated to 1 at the time the cycle T9 begins, to 2 at the time the cycle T10 begins, and to 3 at the time the cycle T11 begins. Therefore, the control device 24 sends, as the micro instruction MI4, the DATA word, the MUL1 instruction and the MUL2 instruction at cycle T9, at cycle T10, and at cycle T11 respectively, to the arithmetic unit 14. Upon receipt of the DATA word, the MUL1 instruction, and the MUL2 instruction, the arithmetic unit 14 sends to the data memory 15 a data variable W(2) representative of a result obtained by multiplying Z(2) and F.

The control decoder 421 detects an assertion of the processing end request bit END of the control signal CONT3 after the counter 431 is updated to 3 at the time the cycle T11 begins, as a result of which the counter 431 is held at 3. At cycle T14, the delay circuit 423 sends to the fifth stage control device 25 the control signal CONT4 which lags the control signal containing the asserted processing end request bit END by three cycles.

As described above, at each of the cycles T6–T11 the fourth stage control device 24 sends the required micro instructions to the arithmetic unit 14. At each of the cycles T8 and T11, the fourth stage control device 24 sends the asserted processing start request bit START to the fifth stage control device 25. At cycle T14, the fourth stage control device 24 sends the asserted processing end request bit END to the fifth stage control device 25.

In the fifth stage control device 25, at cycle T8 the control decoder 521 detects an assertion of the processing start request bit START of the control signal CONT4, as a result of which the counter 531 is reset to 0. The counter 531 is updated to 1 at the time the cycle T9 begins and to 2 at the time the cycle T10 begins. According to the value of the cycle number CYCLE5 stored in the cycle number register 503 (i.e., 1), the comparator 532 causes the multiplexer 514 to select (a) the STORE instruction if the counter 531 is at 1 or (b) the NOP instruction if the counter 531 is at a value other than 1. Therefore, the control device 25 sends, as the micro instruction MI5, the NOP instruction, the STORE instruction, and the NOP instruction at cycle T8, at cycle T9, and at cycle T10 respectively, to the data memory 15. Upon receipt of the STORE instruction, the data memory 15 stores the data variable W(1).

The control decoder 521 detects the asserted processing start request bit START of the control signal CONT4 after the counter 531 is updated to 3 at the time the cycle T11 begins, as a result of which the counter 531 is reset to 0. The counter 531 is updated to 1 at the time the cycle T2 begins and to 2 at the time the cycle T13 begins. Therefore, the control device 25 sends, as the micro instruction MI5, the NOP instruction, the STORE instruction, and the NOP instruction at cycle T11, at cycle T12, and at cycle T13 respectively, to the data memory 15. Upon receipt of the STORE instruction, the data memory 15 stores the data variable W(2).

The control decoder 521 detects an assertion of the processing end request bit END of the control signal CONT4 after the counter 531 is updated to 3 at the time the cycle T14 begins, as a result of which the counter 531 is held at 3. At cycle T15, the delay circuit 523 sends to the control unit 4 the control signal CONT5 which lags the control signal CONT4 containing the asserted processing end request bit END by one cycle according to the value of the cycle number CYCLE5 stored in the cycle number register 503 (i.e., 1).

As described above, at each of the cycles T9 and T12 the control device 25 sends the STORE instruction to the data memory 15. At cycle T15, the control device 25 sends the asserted processing end request bit END to the control unit 4.

With reference to the exemplary case of FIG. 9, at cycle T1 the control signal CONT0, the processing start request bit START of which is asserted, is supplied from the control unit 4 to the first stage control device 21. This enables a first pipeline processing operation for finding the data variables X(1) to W(1) during the cycles T2–T9 and a second pipeline processing operation for finding the data variables X(2) to W(2) during the cycles T5–T12 to be carried out. The fact that the second pipeline operation was completed is communicated to the control unit 4 from the fifth stage control device 25 by the control signal CONT5 containing the asserted processing end request bit END. This means that after the control unit 4 sends the control signal CONT0 to the first stage control device 21, the control unit 4 is allowed to carry out other processing operations until the time the fifth stage control device 25 sends the control signal CONT5 to the control unit 4 because data processing operations are left to the five processing units 11–15. Additionally, since each control device has the capability of generating a NOP instruction for preventing a corresponding processing unit from performing unnecessary processing operations, the storage capacitance of the instruction memory 5 can be reduced.

In FIG. 9, the first register group (the micro instruction registers (#0–#2)) in each of the control devices 22–24 to be selected in the mode A are used. However, instead of using the first register group, the second register group (the micro instruction registers (#3–#5)) to be selected in the mode B can be employed. If the control unit 4 changes the mode bit MODE of the control signal CONT0, this makes a switch from one processing operation to another processing operation in each of the arithmetic units 12–14. For example, in the arithmetic unit 12, it is possible to switch between addition operations with rounding and addition operations without rounding. It is possible to store micro instructions into the second register group simultaneously with execution of micro instructions in the first register group. It is also possible to store micro instructions into the first register group simultaneously with execution of micro instructions in the second register group.

An arrangement, in which micro instructions for usual processing operations are stored in the first register group of the control device 23 and micro instructions for exception (such as overflow) processing operations are stored in the second register group of the control device 23, makes it possible to perform an automatic processing operation switch in the arithmetic unit 13 according to the flag signal FLAG2 supplied from the arithmetic unit 12. The flag signal FLAG3 can be used likewise.

What is claimed is:

1. A data processor comprising a plurality of processing components which are connected together in a cascade arrangement so as to form a first path and a second path, each of said plurality of processing components comprising:
 (a) a first input disposed on said first path,
 (b) a processing unit for:
  performing, according to a micro instruction, a processing operation on a data signal supplied through said first input, and
  sending to said first path a data signal representative of a result of said processing operation,
 (c) a second input disposed on said second path, and
 (d) a control device for:
  starting to send said micro instruction to said processing unit upon detection of a processing start request bit of a control signal supplied through said second input, and
  sending to said second path a signal which lags said control signal by a number of cycles required to complete said processing operation of said processing unit.

2. The data processor as set forth in claim 1, wherein said control device of each of said plurality of said processing components has means for:
 decoding an instruction which has a field indicative of a micro instruction and a field indicative of an address designating a particular one of said plurality of processing components, and
 when a correspondence exists between said address designated in said instruction and an address that said control device is assigned, accepting said micro instruction based on said decoded instruction.

3. The data processor as set forth in claim 1, wherein said control device of each of said plurality of said processing components has:
 (a) a no-operation (NOP) instruction generator for generating a NOP instruction which directs a corresponding processing unit to perform nothing,
 (b) an instruction decoder for decoding an instruction which has a field indicative of a micro instruction and a field indicative of a number of cycles required to complete a processing operation of said processing unit, (c) a micro instruction register for storing said micro instruction obtained from said instruction decoder on the basis of said decoded instruction, (d) a cycle number register for storing said cycle number obtained from said instruction decoder on the basis of said decoded instruction, (e) a multiplexer for:
performing a selection operation of selecting between said NOP instruction generated by said NOP instruction generator and said micro instruction stored in said micro instruction register, and
sending the selected instruction to said processing unit, (f) a control decoder for decoding said control signal supplied through said second input so as to detect said processing start request bit, (g) a delay circuit for delaying said control signal supplied through said second input by said cycle number stored in said cycle number register, (h) a counter for counting pulses of a clock signal, and (i) a comparator for performing a comparison operation of comparing a count value that said counter has reached with said cycle number stored in said cycle number register,
wherein when said control decoder detects said processing start request bit, said counter is reset, and
wherein said selection operation of said multiplexer is controlled according to a result of said comparison operation of said comparator.

4. The data processor as set forth in claim 1, wherein said control device of the first of said plurality of processing components that is disposed foremost in said cascade arrangement has:

(a) a no-operation (NOP) instruction generator for generating a NOP instruction which directs a corresponding processing unit to perform nothing, (b) an instruction decoder for decoding an instruction, said instruction having:
a field indicative of a micro instruction, a field indicative of a number of cycles required to complete a processing operation of said processing unit,
a field indicative of a pipeline pitch representative of the maximum of numbers of cycles required to complete processing operations of all of said processing units of said plurality of processing components, and
a field indicative of a repeat count which is a number of times said processing operation of said processing unit is repeated, (c) a micro instruction register for storing said micro instruction obtained from said instruction decoder on the basis of said decoded instruction, (d) a cycle number register for storing said cycle number obtained from said instruction decoder on the basis of said decoded instruction, (e) a pipeline pitch register for storing said pipeline pitch obtained from said instruction decoder on the basis of said decoded instruction, (f) a repeat count register for storing said repeat count obtained from said instruction decoder on the basis of said decoded instruction, (g) a multiplexer for: performing a selection operation of selecting between said NOP instruction generated by said NOP instruction generator and said micro instruction stored in said micro instruction register, and
sending the selected instruction to said processing unit, (h) a control decoder for decoding said control signal supplied through said second input so as to detect said processing start request bit, (i) a code generator for generating a new control signal so that:
a processing start request bit of said new control signal is asserted whenever said code generator receives a processing start request, and
a processing end request bit of said new control signal is asserted when said code generator receives a processing end request, (j) a delay circuit for delaying said control signal generated by said code generator by said cycle number stored in said cycle number register, (k) a first counter for counting pulses of a clock signal, (l) a first comparator for performing a comparison operation of comparing a count value that said first counter has reached with said cycle number stored in said cycle number register, (m) a second comparator for comparing said count value of said first counter with said pipeline pitch stored in said pipeline pitch register, (n) a second counter for counting pulses supplied whenever said first counter is reset, and (o) a third comparator for comparing a count value that said second counter has reached with said repeat count stored in said repeat count register, wherein:
said first counter is reset when said control decoder detects said processing start request bit or when said second comparator detects a correspondence between said count value of said first counter and said pipeline pitch stored in said pipeline pitch register,
said code generator is fed said processing start request whenever said first counter is reset, and
said selection operation of said multiplexer is controlled according to a result of said comparison operation of said first comparator, and
wherein:
said second counter is reset when said control decoder detects said processing start request bit, and
when said third comparator detects a correspondence between said count value of said second counter and said repeat count stored in said repeat count register, said code generator is fed said processing end request while said first counter is prevented from being updated.

5. The data processor as set forth in claim 4, said control device of each of said plurality of processing components other than said foremost processing component has:

(a) a no-operation (NOP) instruction generator for generating a NOP instruction which directs a corresponding processing unit to perform nothing, (b) an instruction decoder for decoding an instruction, said instruction including:
a field indicative of a micro instruction, and
a field indicative of a number of cycles required to complete a processing operation of said processing unit, (c) a micro instruction register for storing said micro instruction obtained from said instruction decoder on the basis of said decoded instruction, (d) a cycle number register for storing said cycle number obtained from said instruction decoder on the basis of said decoded instruction, (e) a multiplexer for:
  performing a selection operation of selecting between said NOP instruction generated by said NOP instruction generator and said micro instruction stored in said micro instruction register, and
  sending the selected instruction to said processing unit,
(f) a control decoder for decoding said control signal supplied through said second input so as to detect said processing start request bit and said processing end request bit,
(g) a delay circuit for delaying said control signal supplied through said second input by said cycle number stored in said cycle number register,
(h) a counter for counting pulses of said clock signal, and
(i) a comparator for performing a comparison operation of comparing a count value that said counter has reached with said cycle number stored in said cycle number register, wherein:
  said counter is reset whenever said control decoder detects said processing start request bit,
  said selection operation of said multiplexer is controlled according to a result of said comparison operation of said comparator, and
  when said comparator detects said processing end request bit, said counter is prevented from being updated.

6. The data processor as set forth in claim 1, wherein said control device of at least a particular one of said plurality of processing components has:

(a) a no-operation (NOP) instruction generator for generating a NOP instruction which directs a corresponding processing unit to perform nothing,
(b) a plurality of micro instruction registers for storing respective micro instructions,
(c) an instruction decoder for: decoding an instruction which has a field indicative of a micro instruction, a field indicative of a number of cycles required to complete a processing operation of said processing unit, and a field indicative of an index which designates a particular one of said plurality of micro instruction registers, and
  storing said micro instruction on the basis of said decoded instruction in said designated micro instruction register,
(d) a cycle number register for storing said cycle number obtained from said instruction decoder on the basis of said decoded instruction,
(e) a multiplexer for:
  performing a selection operation of selecting between said NOP instruction generated by said NOP instruction generator and one of said micro instructions stored in said plurality of micro instruction registers, and
  sending the selected instruction to said processing unit,
(f) a control decoder for decoding said control signal supplied through said second input so as to detect said processing start request bit,
(g) a delay circuit for delaying said control signal supplied through said second input by said cycle number stored in said cycle number register,
(h) a counter for counting pulses of a clock signal, and
(i) a comparator for performing a comparison operation of comparing a count value that said counter has reached with said cycle number stored in said cycle number register,
  wherein said counter is reset when said control decoder detects said processing start request bit, and
  wherein said selection operation of said multiplexer is controlled according to a result of said comparison operation of said comparator.

7. The data processor as set forth in claim 6,
wherein said plurality of micro instruction registers of said particular processing component are divided into a first group and a second group,
wherein a control signal supplied through said second input has a mode bit used to select between said first group and said second group, and
wherein said control device of said particular processing component further has means operable to send to said multiplexer either of micro instructions stored in said micro instruction registers of the first group and micro instructions stored in said micro instruction registers of the second group according to said mode bit.

8. The data processor as set forth in claim 6,
wherein said plurality of micro instruction registers of said particular processing component are divided into a first group and a second group,
wherein said processing unit of one processing component that is disposed anterior to said particular processing component in said cascade arrangement has a capability of sending a flag signal indicative of an exception occurrence, and
wherein said control device of said particular processing component further has means operable to send to said multiplexer either of micro instructions stored in said micro instruction registers of the first group and micro instructions stored in said micro instruction registers of the second group according to said flag signal.

* * * * *